United States Patent [19]

Weiss

[11] Patent Number: 4,692,928
[45] Date of Patent: Sep. 8, 1987

[54] METHOD FOR IMPROVING THE POWER OF AN AXIAL GAS LASER

[75] Inventor: Hardy P. Weiss, Hütten, Switzerland
[73] Assignee: PRC Corporation, Landing, N.J.
[21] Appl. No.: 786,058
[22] Filed: Oct. 10, 1985
[30] Foreign Application Priority Data

Oct. 10, 1984 [CH] Switzerland .......................... 4861/84

[51] Int. Cl.$^4$ .............................................. H01S 3/03
[52] U.S. Cl. ......................................... 372/63; 372/61
[58] Field of Search ...................................... 372/61, 63

[56] References Cited

U.S. PATENT DOCUMENTS 4,573,162  2/1986  Bakowsky et al. .................... 372/61

Primary Examiner—Gene Wan
Attorney, Agent, or Firm—Antonelli, Terry & Wands

[57] ABSTRACT

A method of lasing gas, a fast axial flow gas laser and an excitation tube for a fast axial flow gas laser are disclosed. Increased thermal energy per mass flow unit of the gas flowing through the excitation tube of the laser can be applied to the gas by controlling at least along a part of the tube the extent of a central area of higher speed gas flow which is surrounded by a circumferential low speed, speed dependent boundary layer by steadily varying the cross-section area of the excitation tube at least along the part thereof to compensate for the circumferential low speed boundary layer.

22 Claims, 8 Drawing Figures

METHOD FOR IMPROVING THE POWER OF AN AXIAL GAS LASER

BACKGROUND AND SUMMARY OF THE INVENTION

The present invention is directed to a method for improving the power of an axial gas laser with an excitation tube wherethrough a gas flows and to an axial gas laser with at least one excitation tube wherethrough gas is flowing and to an excitation tube for an axial gas laser.

The main part of an excitation tube of an axial gas laser is usually straight. In a function of the distance from the gas inlet there is generated by the gas stream a boundary layer on the inner wall of the tube caused by viscosity forces within the flowing gas or the gas mixture. Caused by this boundary layer the flow velocity of the gases viewed across the cross-section of the tube diminishes from a maximum value in the centre of the tube's cross-sectional area to zero at the tube wall region. The thickness of this boundary layer increases in flow direction. Thus there remains, in flow direction, subsequently less free space for the unobstructed flow of the gas so that, in flow direction, the gas velocity must increase for constant gas amount per time unit flowing through all tube cross-sectional areas. With an increasing gas velocity the viscosity forces do also increase and so does the boundary layer too so that the boundary layer increases in its thickness more than proportional along the length of the excitation tube. If in this excitation tube there is additionally applied heat to the gas or the gas mixture as it is done by electrically stimulating the gas, the gas density diminishes i.e. the gas volume rises and thus the flow velocity becomes higher which latter again favours the growth of the boundary layer. With respect to the gas velocity along the excitation tube three different cases may be considered:

(1) The gas flows into the straight tube with a velocity lower than sonic velocity and reaches exactly at its outlet sonic velocity.

(2) The gas flows with supersonic velocity into the tube and is decelerated to sonic velocity at the end of the tube.

(3) The gas flows with supersonic velocity into the tube and is decelerated by means of a compression shock to a velocity below sonic velocity and is then accelerated towards the end of the tube to sonic velocity.

By applying heat to the gas in all three cases there must be considered a velocity change from subsonic to supersonic velocity which latter velocity transition is physically not possible within a straight tube of constant cross-section. If the amount of heat applied reaches a critical value which would lead to said velocity transition of the gas there occurs the thermal chocking phenomenon, that is, the tube will be choked. The stopped gas flow does only restart after interruption of the heat appliance. Thus one is limited on usual axial gas lasers with such excitation tubes with respect to power introduction to the gas by physical occurrences and one is thus also limited with respect to the beam power reachable by such a gas laser.

It is an object of the present invention to provide a method as mentioned above to increase the power of an axial gas laser with an excitation tube wherethrough a gas flows. Thus with a given cross-sectional area of tube as for instance at the gas inlet zone of it, it is a target to enable that the gas may absorb more heat along its travel through the tube without being forced along the tube to a transition from subsonic velocity to supersonic velocity.

This is reached by the method for improving the power of an axial gas laser with an excitation tube wherethrough a gas flows whereby the effect of occurrence of a boundary layer on the tube inner wall as concerns reduction of the cross-sectional area of the tube wherethrough said gas may flow unobstructedly, is taken into account by changing the inner cross-sectional area of said excitation tube at least along an axial part of said excitation tube.

By changing the cross-sectional area of the tube the sectional area which is left "open" for the gas flow from the boundary layer is influenced and thus the resulting flow velocity of the gas is influenced. The changement of the cross-sectional area is determined according to desired characteristica of physical parameters along the length of the excitation tube. Such parameters are especially the pressure of the gas mixture, the gas mixture temperature and possibly and dependent therefrom, other parameters as the Mach number.

The characteristica of the parameters, desired along the tube's axis, are realized by determining the cross-sectional areas at least substantially as indicated from the formula set forth below thereby taking into account that usually the gas used is a gas mixture so that its state equation has to be also considered.

$$\ln\left(\frac{F}{F_1}\right)^2 = \int_o^\xi \frac{1 + M^2 \cdot \kappa}{\frac{c_p T_{01}}{q_2} + \xi} d\xi +$$

$$\ln\left\{\left(\frac{1 + \frac{\kappa - 1}{2} M^2(x)}{1 + \frac{\kappa - 1}{2} M_1^2}\right)^{\frac{\kappa + 1}{\kappa - 1}} \left(\frac{M_1}{M}\right)^2\right\}$$

wherein, with introduction of an x-dependency as dependency from axial coordinate said tube:

$F(x)$: is the flow cross-sectional area at locus x
$F_1$: is the smallest flow cross-sectional area at locus $x_1$
$M(x)$: is the Mach number at locus x
$T_{01}$: is the gas rest temperature
$k(x)$: is the isentropic exponent at the locus x
$c_p(x)$: is the specific heat of the gas at locus x
$q_2$: is the heat applied totally
$\xi(x)$: is the heat applied at locus x relative to the totally applied heat $q_2$
$M_1$: the Mach number at the smallest cross-sectional area at $x_1$ along the tube under consideration of the gas state equation of the gas or gas mixture used. It must be understood that if the heat absorbed by the gas is increased the boundary layer will increase. Such an increase of the boundary layer is inventively compensated for by spreading the excitation tube so that the flowing gas is not forced from sub- to supersonic velocity inspite of further absorption of heat. Evaluation of the expression according to the above formula, results for the special cases wherein the gas pressure or the gas temperature shall be constant along the length of the excitation tube is a changement of cross-sectional areas along at least a part of said excitation tube and in gas flow direction which is at least approximately linearly rising for gas pressure therealong being constant or at least approximately exponentally rising for temperature characteristic there along to be constant.

It is further an object of the invention to provide an axial gas laser with at least one excitation tube wherethrough gas is flowing in which it is possible to apply to said gas more power without the gas having to transition from subsonic or sonic velocity to supersonic velocity which object is reached by said axial gas laser comprising said excitation tube having an inner cross-section area which steadily changes at least along a part of the axial extent of said tube.

It is still a further object of the present invention to provide an excitation tube as mentioned above wherein gas turbulances with one single turbulance center over the cross-sectional area of the tube, said "wide-areal" turbulances, do not occur which is reached by said excitation tube having a flow cross-section departing from circular form.

It is a still further object of the present invention to provide for said gas laser then built as electrically excited laser, an electrode arrangement which does not disturb the flow of gas through said excitation tube which is reached by said gas laser comprising at least one electrode arrangement which lies substantially without forming a radial stop and/or a radial groove along the circumference of the inner wall of said excitation tube.

A further object of the invention is to provide the possibility to have said electrode arrangement disposed within the tube of changing cross-sectional area. This is reached by having said electrode arrangement comprising a conical inner bore to realize a changement of said inner cross-section area of said tube.

A still further object of the present invention is to provide an excitation tube for an axial gas laser which excitation tube gives the possibility to apply more heat to a gas used in such an axial gas laser thus having that gas absorb more thermal energy and thus allowing such a laser to develop more optical energy. This is reached by an excitation tube according to the present invention for an axial gas laser wherein the cross-sectional area of said tube steadily changes at least along the part thereof preferably growing towards one of the ends of said tube at least nearly linearly or exponentially.

Beside energy considerations it is important to ensure a uniform flow along the excitation tube. Any "wide-areal" turbulances with one center of turbulance across the respective cross-sectional areas of the tube should be avoided and in opposition thereto small areal turbulances which show several turbulance centers across respective cross-sectional areas of the tube should be maintained or generated because such "small-areal" turbulances improve the mixing effect of the gas throughout the excitation tube. Omission of such "wide-areal" turbulances and introduction of small areal turbulances is reached as mentioned above by providing cross-sectional areas of the excitation tube departing from circular shape being for instance of a triangular, four-angular or elliptical shape. By such a shape formation of "wide areal" turbulances is prevented and occurrence of small areal turbulances is improved.

If, as mentioned above, the inventive excitation tube has to be provided with an electrode arrangement, its provision without any stop and without any radial gap along the inner wall of the tube prevents again occurrence of "wide areal" turbulances. If the electrode is disposed in a region where inventively the cross-sectional area of the tube varies especially becomes larger, then the electrode arrangement is provided with an accordingly conical inner bore which fits as exactly as possible and without the mentioned stops and gaps along the inner wall of the tube.

Preferred embodiments and further objects of the invention will become evident from the examples which will now be described by way of figures.

DETAILED DESCRIPTION OF THE DISCLOSED EMBODIMENTS

Figure 1:
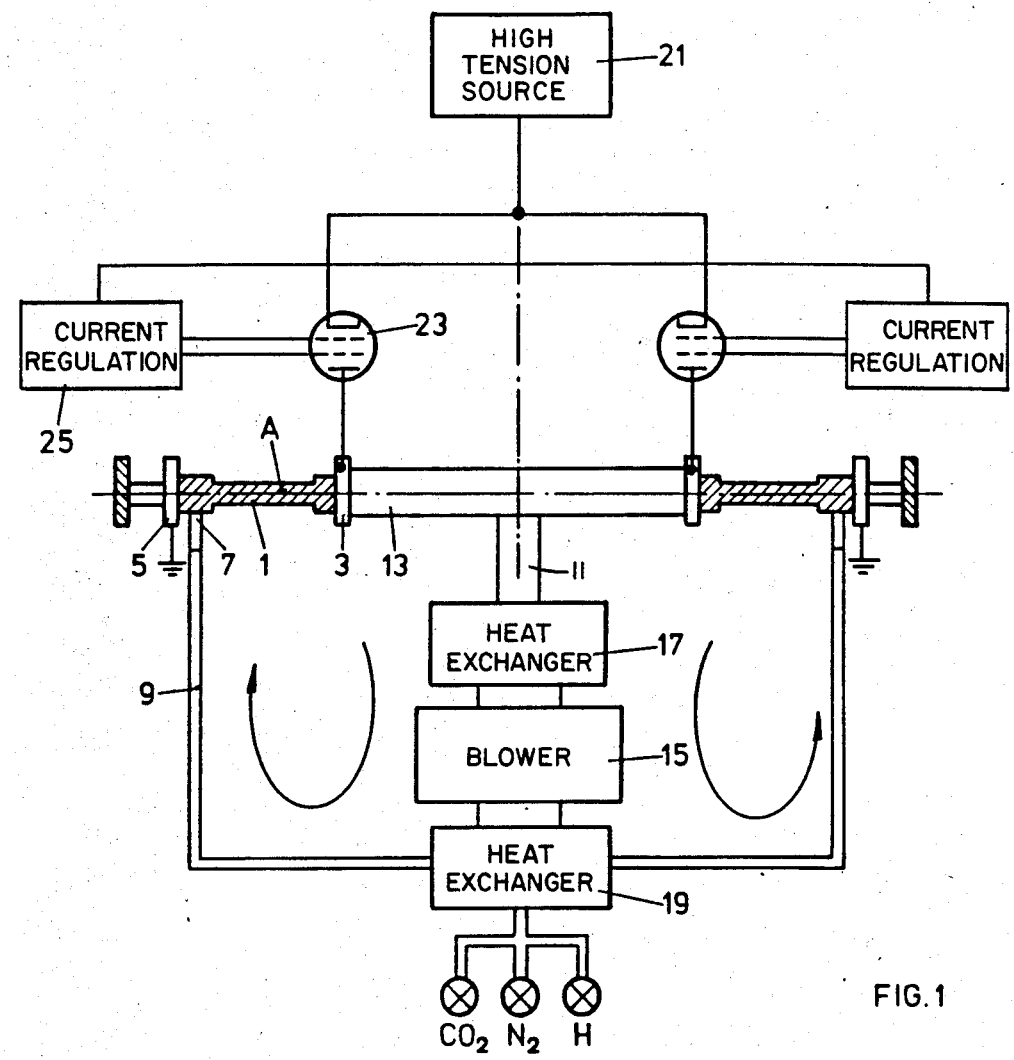
FIG. 1 In principle a "two-stage" high power electrically excited, axial gas laser as one laser type where the inventive features are applied on such a one or multiple stage laser.

FIG. 1 in principle shows the arrangement of a high power axial gas laser. The laser shown is a two-stage laser with a first stage left-hand of the dotted line and a second stage right-hand thereof. As the laser arrangement is symmetrically built with respect to that dotted line only the stage left-hand of that line will be described. The arrangement comprises an excitation stage tube 1 at one end of which a cathode 3 and on the other end of which an anode 5 being provided. At one end of the excitation tube 1 an inlet pipe 9 discharges into an inlet zone 7 at the other end a discharge pipe 11 departs from an outlet zone 13 of the excitation tube 1. With the help of a blower 15 provided with input and output side heat exchangers 17 and 19 a gas mixture as of carbonic acid, nitrogene and hydrogene is driven through the excitation tube 1 in the direction shown by the arrow. The central axis A of the both side opened excitation stage tube is the optical axis of the laser beam. As is further shown the electrodes 3 and 5 are fed by means of a high tension source 21, a control arrangement for instance in the form of a high voltage tube 23 whereby the tube 23 and a current regulation 25 controlling the tube give the possibility to adjust the electrode current. The present invention is directed on measures at the excitation tube 1.

Figure 2A:
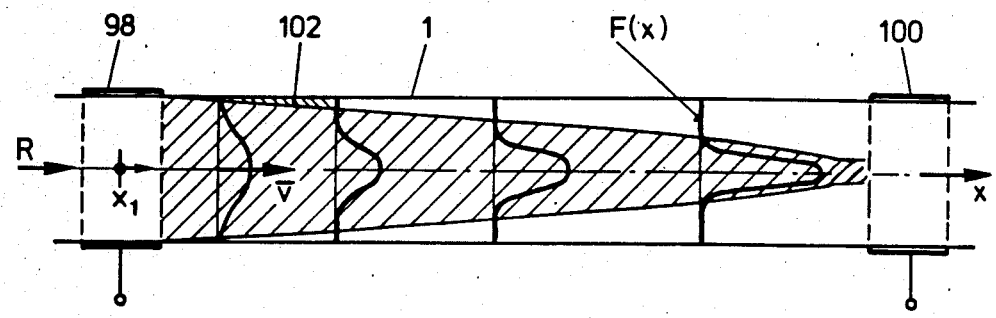
FIG. 2a Qualitatively the flow characteristics on a known excitation tube.

FIG. 2a shows a common straight excitation tube 1 with, schematically, an anode 98 and a cathode 100 shown. With rising distance x from the gas inlet zone there occurs a flow boundary layer 102 which is caused by viscosity forces within the gas flow. As is shown by the velocity profiles qualitatively drawn over respective cross-sectional areas F and in function of the coordinate x the velocity v in each cross-sectional plane diminishes towards zero at the tube wall region departing from a maximum value at the central axis region. As is further shown the thickness of the boundary layer 102 grows with rising x in gas flowing direction R. As may be seen from the flow profiles the active cross-sectional area with respect to the gas transport diminishes thus with rising x-coordinate, the space remaining for an undisturbed gas flow becomes smaller and smaller. From considerations of continuity there follows that the gas velocity must rise within the transport-active and remaining cross-sectional area which results again in a rise of the viscosity forces and thus of the boundary layer thickness. Such a system may be considered as a positive feedback coupled system an input signal to which leading to an unstable rise of the system output. The system input may be considered as the input velocity and the output for instance the boundary layer thickness at the end of the tube. If and as it is realized by applying an electrical field, additional heat is applied to the gas within the excitation tube the gas volume will rise and thus the flow velocity and the boundary layer thickness will increase. There is a limit for the rise of the gas velocity within the tube given by the transition from subsonic to supersonic velocity which limit cannot be overcome. This phenomenon which was here explained purely heuristically is known as "thermal choking".

Figure 2B:
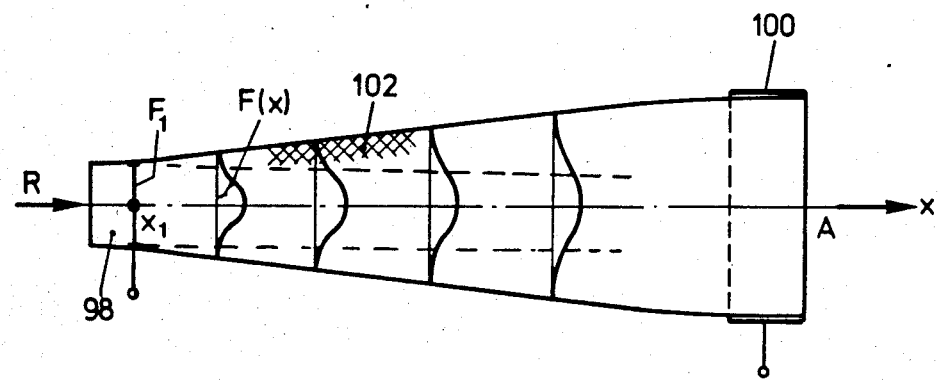
FIG. 2b An inventive excitation tube with, qualitatively, the flow characteristica there along.

In FIG. 2b there is shown qualitatively the shape of an inventive excitation tube. As is shown the tube diverges in gas flow direction R i.e. with rising coordinate value x the cross-sectional area F(x) of the tube rises with respect to the smallest cross-sectional area $F_1$ as for instance at the input end of the excitation tube. By means of this spreading of the tube wall according to laws which will be described later it is reached that the boundary layer growth with rising coordinate value x does not necessarily result in a rise of flow speed of the gases in dependency of the coordinate x, because the reduction of transport active cross-sectional area by the rising boundary layer is compensated by spreading of the tube. This and with respect to the description of FIG. 2a there may be applied considerably more heat to the gas along the tube without risk that the critical velocity transition occurs which would lead to the above mentioned choking of the tube. Thus and with the inventive method and excitation tube there may be applied much more electrical power to the tube and there results thus a considerably higher laser output power. The shape of the excitation tube is selected according to desired functions of physical parameters along the excitation stage in function of the x-coordinate. In principle the expression $$\ln\left(\frac{F}{F_1}\right)^2 = \int_0^\xi \frac{1 + M^2 \cdot \kappa}{\frac{c_p T_{01}}{q_2} + \xi} d\xi +$$

$$\ln\left\{\left(\frac{1 + \frac{\kappa - 1}{2} M^2(x)}{1 + \frac{\kappa - 1}{2} M_1^2}\right)^{\frac{\kappa + 1}{\kappa - 1}} \left(\frac{M_1}{M}\right)^2\right\}$$

is exploited wherein the following symbols define, under consideration of its x-dependencies, as dependencies from the tube's axial coordinate:

F(x): the inner tube cross-sectional area at locus x
$F_1$: the smallest inner cross-sectional area of the excitation tube at locus $x_1$ M(x): the Mach number which is generally dependent from the coordinate x together with the cross-sectional area
$M_1$: the Mach number at the smallest cross-sectional area at $x_1$ along the tube
$T_{01}$: the stagnant gas temperature
$\kappa(x)$: the isentropic exponent in general form being dependent from the coordinate x as well
$c_p(x)$: the specific heat of the gas being in general dependent from the coordinate x as well
$q_2$: the amount of heat being applied to the gas within a tube part according to the heat applied to the complete tube
$\xi(x)$: the heat applied at a locus x relative to the total heat application $q_2$.

Figure 2C:
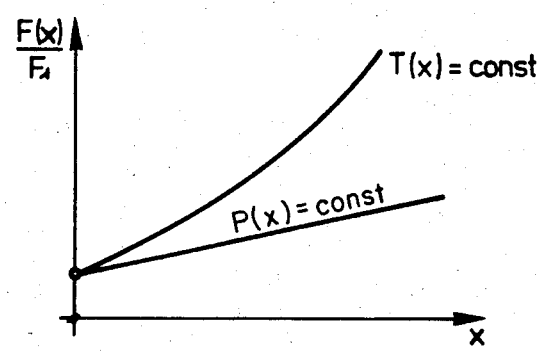
FIG. 2c Qualitatively the dependency of cross-sectional areas of the tube according to FIG. 2b from the tube axial coordinate x for constant gas pressure p(x) or constant gas temperature T(x) therealong.

The exploitation of this formula considering the state equation of the gas or gas mixture respectively results in a cross-section area function along the coordinate x in dependency from the desired x-dependent characteristics of one or more than one of the parameters within the formula e.g. of the gas pressure p(x), the temperature T(x) or of the Mach number M(x) of the gas. Exploitation of the above mentioned formula results in the characteristics qualitatively shown in FIG. 2c of the inner cross-sectional tube area relative to its smallest cross-sectional area $F_1$ in function of the coordinate x for a gas pressure p(x) which is to be held constant along the coordinate x or for a constant temperature T(x) along this coordinate x, the latter case resulting in exponentially rising cross-sectional areas. Generally, the formula mentioned above cannot be resolved straight forward but the solution $F(x)/F_1$ will normally be calculated numerically with the help of a computer for each x-value.

Figure 3A:
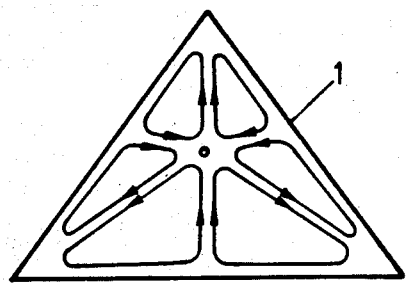
FIGS. 3–3c Schematic cross-sectional areas of an inventive tube with several cross-sectional shapes to prevent occurrence of wide-areal turbulances.
Figure 3B:
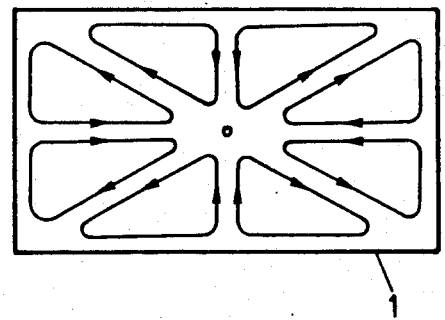
Figure 3C:
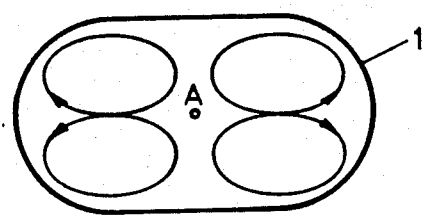

The FIGS. 3a to 3c show features which provided at the inventive excitation tube as shown for instance in FIG. 2b prevent a possible occurrence of wide areal turbulances with a sole turbulance center across respective cross-sectional areas of the tube.

It is known that the tendency that single and thus wide areal turbulances occur over the flow cross-section of a tube is the higher the more the tube cross-section is exactly circular. To prevent that occurrence, the flow cross-section of the excitation tube 1 departs according to FIGS. 3a to 3c from the circular form and shows for instance a triangular, four-angular, polyangular or elliptical shape. The occurrence of symmetrical but "small areal" turbulances are shown in the FIGS. 3a to 3c. These "small areal" turbulances favour a good mixture of the gas which flows axially through the excitation tube 1 as that of FIG. 2b.

Figure 4:
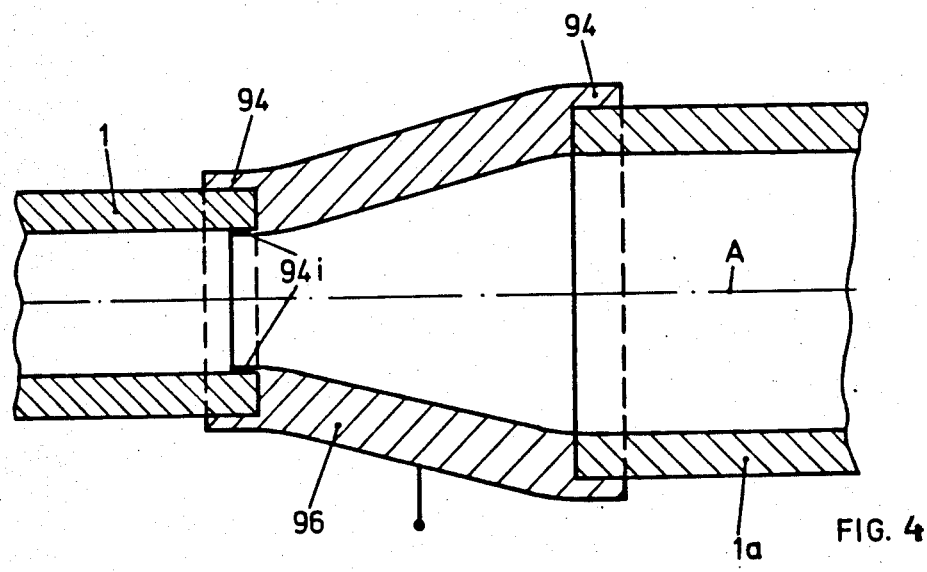
FIG. 4 A part of an axial section of the tube of FIG. 2b with an electrode arrangement along the tube's inner wall.

The FIG. 4 shows an electrode specially designed for anode and/or cathode application at an excitation tube according to the invention. The tube 1 is here made of two axial parts 1 and 1a. Between the excitation tube part 1 and part 1a for the laser beam along optical axis A, the electrode 96 is mounted as a hollow cone electrode. The electrode is so dimensioned that it forms substantially no stop with respect to the inner wall of the tube parts 1 and 1a respectively. The electrode rests for instance with circular collars 94 against the tube 1 and 1a. With that shown construction of the electrode 96 it smoothly fits to the di- or convergent walls of the inventive tube, as that shown in FIG. 2b.

I claim:
1. In a method of lasing gas in a fast axial flow gas transport laser comprising generating a flow of a gas along an excitation tube and wherein said gas is loaded with thermal energy increasing in the flow direction of said gas within said excitation tube and wherein said flow of gas forms within cross-sections of said tube a circumferential low speed, speed dependent boundary layer and a central area of higher speed gas flow, the improvement comprising enlarging the thermal energy applicable to said gas per massflow unit of said gas through said tube by controlling at least along a part of said tube the extent of said central area by steadily varying the cross-section area of said tube at least along said part to compensate for said circumferential low speed boundary layer.

2. The method according to claim 1, wherein a characteristic of at least one physical parameter of said gas along an axial extent of at least said part of said tube is preselected and said cross-section area of said tube is varied along said part to control the extent of said central area so as to result in a characteristic of said at least one physical parameter of said gas substantially according to said preselected characteristic.

3. The method of claim 2, wherein said characteristic of at least said one physical parameter preselected is a constant pressure of said gas along said axial extent and said cross-section area of said tube is varied along said part to at least approximately linearly rise along said axial extent.

4. The method of claim 2, wherein said characteristic of at least said one physical parameter preselected is a constant temperature of said gas along said axial extent and said cross-section area of said tube is varied along said part to at least approximately exponentally rise along said axial extent.

5. The method according to claim 1, wherein said cross-section area of said tube at least along said part is varied at least approximately according to:

$$\ln\left(\frac{F}{F_1}\right)^2 = \int_o^\xi \frac{1 + M^2 \cdot \kappa}{\frac{c_p T_{01}}{q_2} + \xi} d\xi +$$

$$\ln\left\{\left(\frac{1 + \frac{\kappa - 1}{2} M^2(x)}{1 + \frac{\kappa - 1}{2} M_1^2}\right)^{\frac{\kappa + 1}{\kappa - 1}} \left(\frac{M_1}{M}\right)^2\right\}$$

wherein:
x: is the axial coordinate of said part
F = F(x): is said cross-section area varied at a function of said axial coordinate
$F_1$: is the smallest value of said cross-section area varied, at an axial locus $x_1$
M = M(x): is the Mach number as a function of said axial coordinate
$T_{01}$: is the stagnant temperature of said gas
K = k(x): is the isentropic exponent as a function of said axial coordinate
$c_p = c_p(x)$: is the specific heat of said gas as a function of said axial coordinate
$q_2$: is the heat totally applied to said gas along at least said part of said tube
$\xi = \xi(x)$: is the heat locally applied to said gas, relative to said heat totally applied, as a function of said axial coordinate
$M_1$: is the Mach number at said axial locus $x_1$
and the gas state equation of said gas.

6. A fast axial flow gas laser comprising at least one excitation tube through which gas can be flowed, means for flowing gas along said excitation tube, and means for exciting the flowing gas to cause said gas to lase, wherein said excitation tube has an inner cross-sectional area which steadily varies at least along a part of the axial extent of said tube to compensate for a circumferential low speed, speed dependent boundary layer of the flowing gas which is formed within cross-sections of said tube about a central area of higher speed gas flow during the flow of gas along the excitation tube.

7. The gas laser according to claim 6, through which gas is flowed and in which said flowing gas is excited, wherein gas has a substantially constant pressure along at least said part of said axial extent of said tube.

8. The gas laser according to claim 6 through which gas is flowed and in which said flowing gas is excited, wherein said gas has a substantially constant temperature along at least said part of said axial extent of said tube.

9. The gas laser according to claim 6, wherein said inner cross-sectional area varies at least nearly linearly at least along said part of said axial extent of said tube.

10. The gas laser according to claim 6, wherein said inner cross-sectional area varies at least nearly exponentially at least along said part of said axial extent of said tube.

11. The gas laser according to claim 6 through which gas is flowed and in which said flowing gas is excited and is loaded with thermal energy increasing in flow direction of said gas within said tube, wherein said inner cross-sectional area varies at least along said part of axial extent at least approximately according to:

$$\ln\left(\frac{F}{F_1}\right)^2 = \int_o^\xi \frac{1 + M^2 \cdot \kappa}{\frac{c_p T_{01}}{q_2} + \xi} d\xi +$$

$$\ln\left\{\left(\frac{1 + \frac{\kappa - 1}{2} M^2(x)}{1 + \frac{\kappa - 1}{2} M_1^2}\right)^{\frac{\kappa + 1}{\kappa - 1}} \left(\frac{M_1}{M}\right)^2\right\}$$

wherein:
x: is the axial coordinate of said part
F = F(x): is said cross-section area varied as a function of said axial coordinate
$F_1$: is the smallest value of said cross-section area varied, at an axial locus $x_1$
M = M(x): is the Mach number as a function of said axial coordinate
$T_{01}$: is the stagnant temperature of said gas
K = k(x): is the isentropic exponent as a function of said axial coordinate
$c_p = c_p(x)$: is the specific heat of said gas as a function of said axial coordinate
$q_2$: is the heat totally applied to said gas along at least said part of said tube
$\xi = \xi(x)$: is the heat locally applied to said gas, relative to said heat totally applied, as a function of said axial coordinate
$M_1$: is the Mach number at said axial locus $x_1$
and the gas stage equation of said gas.

12. The gas laser of claim 6, wherein said tube has a non-circular inner cross-sectional area.

13. The gas laser of claim 6, wherein the inner wall of said tube is formed, along at least one part of the axial extent of said tube, by a ring-shaped electrode arrangement.

14. The gas laser of claim 13, wherein said one part of said axial extent along which said inner wall of said tube is formed by said ring-shaped electrode arrangement being part of said part of said axial extent of said tube along which said inner cross-sectional area varies.

15. The gas laser of claim 13, wherein said ring-shaped electrode arrangement substantially steadily abuts adjacent parts of said tube inner wall.

16. An excitation tube for a fast axial flow gas laser wherein a flow of gas is generated along the excitation tube, wherein the gas is loaded with thermal energy increasing in the flow direction of the gas within the excitation tube and wherein the flow of gas forms within cross-sections of said tube a circumferential low speed, speed dependent boundary layer and a central area of higher speed gas flow, said excitation tube having a cross-sectional area which steadily varies at least along a part of the axial extent of said tube to compensate for said circumferential low speed boundary layer.

17. The excitation tube of claim 16, wherein said cross-sectional area varies approximately linearly along said part of said axial extent.

18. The excitation tube of claim 16, wherein said cross-sectional area varies approximately exponentially along said part of said axial extent.

19. The excitation tube of claim 16, wherein said cross-sectional area is non-circular.

20. The excitation tube of claim 16, wherein the inner wall of said tube is formed, along at least one part of the axial extent of it, by a ring-shaped electrode arrangement.

21. The excitation tube of claim 20, wherein said part of said axial extent of said tube along which the inner wall thereof is formed by said ring-shaped electrode arrangement is part of said part of said axial extent along which said cross-sectional area varies.

22. The excitation tube of claim 20, wherein said ring-shaped electrode arrangement substantially steadily abuts adjacent parts of said inner wall of said tube.

* * * * *